(12) United States Patent
Mellet et al.

(10) Patent No.: US 8,967,009 B2
(45) Date of Patent: Mar. 3, 2015

(54) SIX, SEVEN, AND EIGHT SPEED LAYSHAFT AUTOMATIC TRANSMISSION

(71) Applicant: GM Global Technology Operations LLC, Detroit, MI (US)

(72) Inventors: Edward W. Mellet, Rochester Hills, MI (US); Bret M. Olson, Whitelake, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 192 days.

(21) Appl. No.: 13/669,936

(22) Filed: Nov. 6, 2012

(65) Prior Publication Data

US 2014/0123791 A1   May 8, 2014

(51) Int. Cl.
*F16H 3/08* (2006.01)

(52) U.S. Cl.
USPC .............................................. 74/331

(58) Field of Classification Search
CPC .............. F16H 2003/093; F16H 2003/0931; F16H 2200/0047
USPC ................................... 74/330, 331
See application file for complete search history.

(56) References Cited

U.S. PATENT DOCUMENTS

| 6,250,171 B1 * | 6/2001 | Sperber et al. ................. 74/331 |
| 8,142,322 B2 * | 3/2012 | Raszkowski ................. 475/207 |
| 8,342,048 B2 * | 1/2013 | Rieger ............................ 74/330 |
| 2009/0272212 A1 * | 11/2009 | Raszkowski ................... 74/331 |
| 2010/0251844 A1 * | 10/2010 | Ross et al. ..................... 74/340 |

OTHER PUBLICATIONS

Pending U.S. Appl. No. 13/312,429, filed Dec. 6, 2011, by Olsen et al. All pages.

* cited by examiner

*Primary Examiner* — Ha D Ho

(57) ABSTRACT

A transmission includes a housing, an input member connectable to an engine output member, and a launch clutch assembly connected to the input member. A first and a second countershaft are rotatably supported within the transmission housing. A plurality of co-planar gear sets are connected to the input member and the first and second countershafts. A plurality of torque transmitting mechanisms are provided for coupling various components of the co-planar gear sets to the input member and countershafts. The selective engagement of the launch clutch assembly and the torque transmitting mechanisms establishes at least one of six forward speed ratios and a reverse speed ratio.

19 Claims, 2 Drawing Sheets

SIX, SEVEN, AND EIGHT SPEED LAYSHAFT AUTOMATIC TRANSMISSION

FIELD

Figure 1:
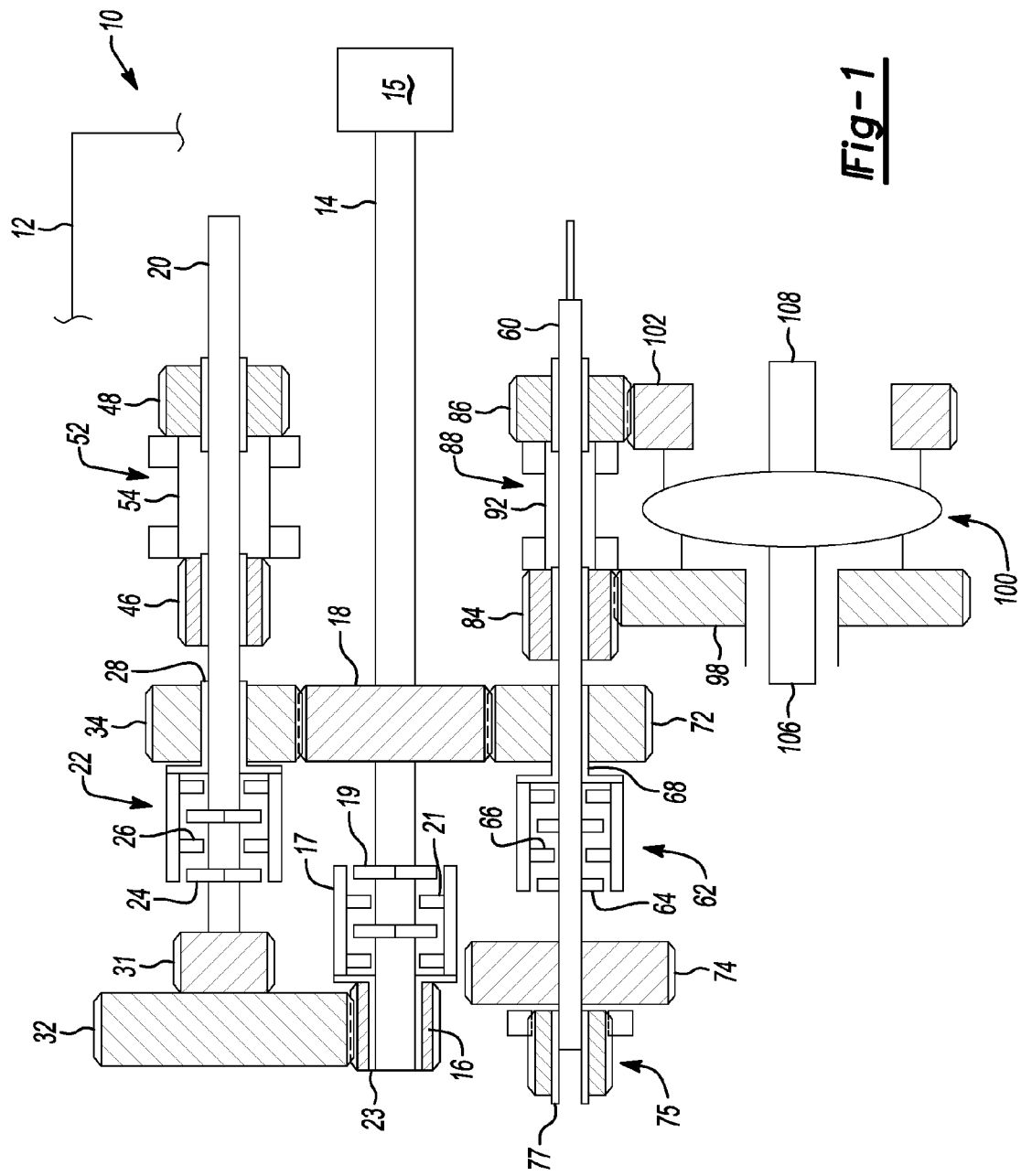

The present disclosure relates to transmissions for motor vehicles and more particularly to automatic transmissions having one or more layshafts and having a compact design and which provides six, seven, or eight forward speeds or gears.

BACKGROUND

The statements in this section merely provide background information related to the present disclosure and may or may not constitute prior art.

Dual clutch transmissions are a relatively recent addition to the stable of motor vehicle transmissions which previously included manual, continuously variable and automatic transmissions. Dual clutch transmissions or DCT's as they are now commonly known, combine good fuel economy with rapidly executed shifts. From a performance standpoint, therefore, they closely duplicate the feel and operation of a conventional mechanical transmission. Additionally, they may be configured to operate as an essentially automatic or manual transmission and thus exhibit exceptional versatility.

Structurally, dual clutch transmissions typically include an input shaft which drives a pair of mutually exclusively engaged input clutches. The input clutches drive a pair of countershafts which each include a plurality of gears freely rotatably disposed on the countershafts and associated synchronizer clutches. The pluralities of gears are in constant mesh with gears secured to an output shaft. Activation of a synchronizer clutch synchronizes and couples a selected gear to its countershaft. Then, the input clutch associated with that countershaft is engaged to transmit torque from the input shaft to the output shaft. Because clutches, gears and synchronizers are disposed or stacked along the countershafts, the axial length of dual clutch transmissions can create packaging issues, particularly in smaller vehicles.

While there are various ways to classify or categorize dual clutch transmissions, one approach to classification relates to the type of clutch utilized in the transmission: wet or dry. A wet dual clutch transmission contains lubricating transmission fluid not only in the gear and synchronizer section but also in the input clutches. A dry dual clutch transmission, of course, includes transmission fluid in the gear and synchronizer section but not in the clutches. While wet dual clutch transmissions offer slightly better durability and longer clutch life because of the cooling provided by the transmission fluid, they exhibit higher spin losses. Moreover, the incorporation of a lubrication pump which provides pressurized lubricating and cooling fluid further affects overall efficiency. Accordingly, wet dual clutch transmissions, all other parameters being equal, typically exhibit slightly lower fuel economy than dry dual clutch transmissions.

From the foregoing, it is apparent that improvements addressing both packaging and efficiency issues of dual clutch transmissions are both desirable and possible. The present invention is so directed.

SUMMARY

A layshaft automatic transmission is provided. The transmission includes a transmission housing, an input member connectable to an engine output member, a sleeve member at least partially concentric with the input member and at least partially surrounds the input member, a launch clutch assembly connected to the input member and to the sleeve member, wherein the launch clutch is selectively engageable to transmit torque from the input member to the sleeve member, a first drive gear rotatably fixed for common rotation with the sleeve member, and a second drive gear rotatably fixed for common rotation with the input member. A first countershaft is rotatably supported within the transmission housing and is spaced apart from and parallel with the input member and the sleeve member. A second countershaft is rotatably supported within the transmission housing and is spaced apart from and parallel with the input member and the sleeve member. A first driven gear is rotatably fixed for common rotation with the first countershaft and is in mesh with the first drive gear, a second driven gear is selectively connectable for common rotation with the first countershaft and is in mesh with the second drive gear, a third driven gear is selectively connectable for common rotation with the second countershaft and is in mesh with the second drive gear, a fourth driven gear is selectively connectable for common rotation with the second countershaft and in mesh with a transfer gear, a first output gear is selectively connectable for common rotation with the first countershaft, a second output gear is selectively connectable for common rotation with the first countershaft, a third output gear is selectively connectable for common rotation with the second countershaft, and a fourth output gear is selectively connectable for common rotation with the second countershaft. A plurality of torque transmitting mechanisms are provided for coupling various combinations of the drive gears, driven gears, and output gears to the input member, sleeve member, and countershafts. The selective engagement of the launch clutch assembly and the torque transmitting mechanisms establishes at least one of six forward speed ratios and a reverse speed ratio.

In one aspect of the present invention the torque transmitting mechanisms include two clutches and three synchronizer assemblies and a launch device.

In another aspect of the present invention the torque transmitting mechanisms include two clutches, two synchronizer assemblies, a dog clutch and a launch device.

In another aspect of the present invention the torque transmitting mechanisms include three synchronizers.

In yet another aspect of the present invention the transmission includes a fifth driven gear for providing at least seven forward speed or gear ratios.

In yet another aspect of the present invention the transmission provides at least eight forward speed or gear ratios.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
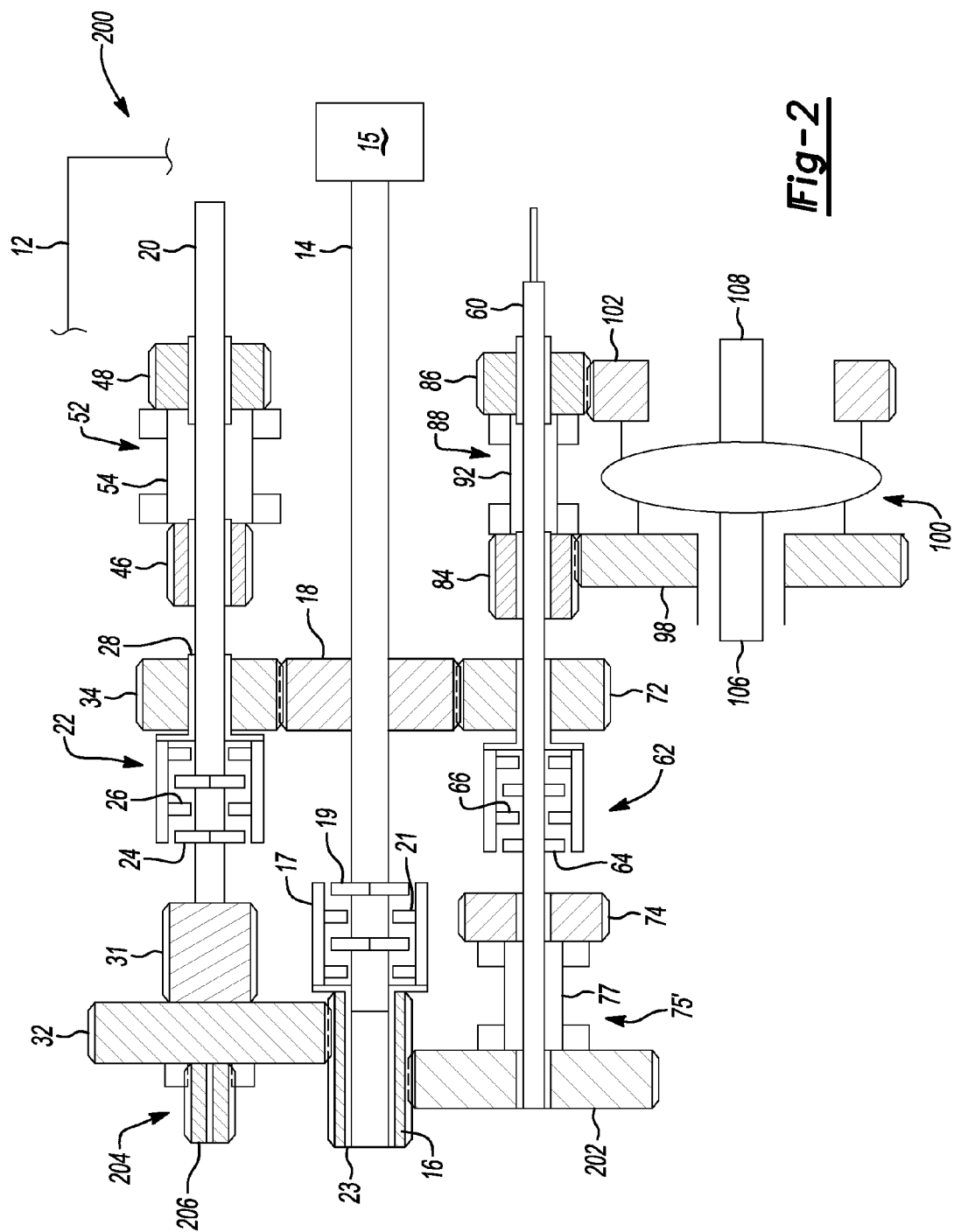

FIG. 1 is a diagrammatic view of an embodiment of a six speed layshaft transmission; and FIG. 2 is a diagrammatic view of another embodiment of a seven or eight speed layshaft transmission.

It will be appreciated that in all of the drawings, certain components, for example, the output gears, the differential assembly and the output shafts or axles have been rotated out of radial position or gear sizes or shaft spacings have been altered in order to illustrate the components, their locations and interconnections more clearly.

DETAILED DESCRIPTION

The following description is merely exemplary in nature and is not intended to limit the present disclosure, application, or uses.

With reference to FIG. 1, a six speed transmission is illustrated and generally designated by the reference number 10. The six speed transmission 10 includes a housing 12 having various bores, openings, flanges and features that receive, locate, support and protect the components of the transmission 10. The housing 12 rotatably supports a transmission input shaft 14. The input shaft 14 is coupled at one end to a flywheel damper assembly 15. The flywheel damper assembly 15 receives input torque from a prime mover (not shown), such as a combustion engine, a hybrid engine, or an electric motor. The input shaft 14 is coupled at an opposite end to a launch clutch 17. The launch clutch 17 includes a first plurality of clutch plates or discs 19 coupled to the input shaft 14 for rotation therewith. Interleaved with the first plurality of clutch plates or discs 19 is a second plurality of clutch plates or discs 21 that are coupled to and rotate with a quill, sleeve shaft, or drive tube 23. The launch clutch 17 is engageable to selectively transfer torque from the input shaft 14 to the drive tube 23.

A first, smaller input drive gear 16 is rotatably fixed to the drive tube 23 and a second, larger input drive gear 18 is fixed to the input shaft 14. It should be appreciated that the terms "smaller" and "larger" with reference to gear sizes are utilized herein only in the most relative and general sense and primarily for the purpose of locating or identifying the gears in the respective drawing Figures. Accordingly, it should be understood that the actual gear sizes, and their relative sizes, may vary from such descriptions in order to achieve certain or specific gear ratios and/or speed changes.

Also rotatably supported in the housing 12 is a first layshaft or countershaft 20 associated with first, second, fourth, and sixth gears and a second layshaft or countershaft 60 associated with third, fifth, and reverse gears. However, there may be arrangements that benefit from further mixing odd and even gears on a layshaft/countershaft and the above description by no means limits the scope of the invention. The first countershaft 20 and the second countershaft 60 are parallel to and spaced from the input shaft 14. At one end of the first countershaft 20 is a first, wet input clutch assembly 22 having a first plurality of clutch plates or discs 24 coupled to the first countershaft 20 for rotation therewith. Interleaved with the first plurality of clutch plates or discs 24 is a second plurality of clutch plates or discs 26 that are coupled to and rotate with a first quill or drive tube 28. The first wet clutch assembly 22 is engageable to selectively transfer torque from the first quill or drive tube 28 to the first countershaft 20.

Disposed on the first countershaft 20 is a first, larger driven gear 32 in constant mesh with the first, smaller input drive gear 16. Disposed on the first drive tube 28 is a second, smaller driven gear 34 in constant mesh with the second, larger input gear 18. Disposed on the first countershaft 20 is a driven gear 31 that is adjacent the driven gear 32. Disposed between the first, larger driven gear 32 and the second, smaller driven gear 34 is the first wet, input clutch assembly 22.

Freely rotatably disposed on the first countershaft 20 is a third drive gear 46 and a fourth, smaller drive gear 48 axially spaced from the third drive gear 46. Disposed between the third, larger drive gear 46 and the fourth, smaller drive gear 48 is a first double synchronizer clutch assembly 52. The first synchronizer clutch assembly 52 is rotationally coupled to the first countershaft 20 by a first interengaging synchronizer 54 and is free to translate axially along the first countershaft 20. A shift actuator assembly (not shown) which may be mechanical, hydraulic, electric or pneumatic, bi-directionally translates the first synchronizer clutch assembly 52. When translated to the right or left from a neutral center position, the first synchronizer clutch assembly 52 first synchronizes the speed of the adjacent gear, either the gear 48 to the right or the gear 46 to the left, and then positively couples the synchronized gear to the first countershaft 20.

At one end of the second countershaft 60 is a second, wet input clutch assembly 62 having a first plurality of clutch plates or discs 64 coupled to the second countershaft 60 for rotation therewith. Interleaved with the first plurality of clutch plates or discs 64 is a second plurality of clutch plates or discs 66 that are coupled to and rotate with a second quill or drive tube 68. The second wet input clutch assembly 62 is engageable to selectively transfer torque from the second quill or drive tube 68 to the second countershaft 60.

Disposed on the second quill or drive tube 68 is a fifth, driven gear 72 in constant mesh with the second, larger input drive gear 18. Freely rotatably disposed on the second countershaft 60 is a sixth, driven gear 74 in constant mesh with the driven gear 31. Disposed between the fifth, driven gear 72 and the sixth, driven gear 74 is the second, wet input clutch assembly 62.

Disposed adjacent the sixth, driven gear 74 is a reverse dog clutch or single sided synchronizer clutch assembly 75. The synchronizer clutch assembly 75 is rotationally coupled to the second countershaft 60 by a synchronizer 77 and is free to translate axially along the second countershaft 60. A shift actuator assembly (not shown) which may be hydraulic, electric or pneumatic, engages and bi-directionally translates the synchronizer clutch assembly 75. When translated to the right from a neutral center position, the synchronizer clutch assembly 75 first synchronizes the speed of the adjacent gear 74 and then positively couples the synchronized gear 74 to the second countershaft 60.

Freely rotatably disposed on the second countershaft 60 is a seventh, larger drive gear 84 and an eighth, smaller drive gear 86 axially spaced from the seventh drive gear 84. Disposed between the seventh, larger drive gear 84 and the eighth, smaller drive gear 86 is a second double synchronizer clutch assembly 88. The second synchronizer clutch 88 is rotationally coupled to the second countershaft 60 by synchronizer 92 and is free to translate axially along the second countershaft 60. A second shift actuator assembly (not shown) which may be mechanical, hydraulic, electric or pneumatic, engages and bi-directionally translates the second synchronizer clutch assembly 88. When translated to the right or left from a neutral center position, the second synchronizer clutch assembly 88 first synchronizes the speed of the adjacent gear, either the gear 86 to the right or the gear 84 to the left, and then positively couples the synchronized gear to the second countershaft 60.

The third, larger drive gear 46 and the seventh, larger drive gear 84 both are in constant mesh with and drive a first output or ring gear 98 that is associated with and is an input member to a differential assembly 100. Similarly, the fourth, smaller drive gear 48 and the eighth, smaller driven gear 86 both are in constant mesh with and drive a second output or ring gear 102 that is also associated with and is an input member to the differential assembly 100. The differential 100 is coupled to a respective pair of axles or output shafts 106 and 108.

In the embodiment illustrated in FIG. 1, the first driven gear 32 is associated and active with first gear and fourth gear, the second driven gear 34 is associated and active with second and sixth gears, the third drive gear 46 is associated and active with first and second gears, and the drive gear 48 is associated and active with fourth and sixth gears. The fifth driven gear 72 is associated and active with third and fifth gears, the sixth driven gear 74 and the drive gear 31 are associated and active with reverse, the seventh drive gear 84 is associated and active with third gear and reverse, and the drive gear 86 is associated and active with fifth gear.

For example, to engage first gear, the first double synchronizer clutch assembly 52 is translated to the left to synchronize and connect the gear 46 to the first countershaft 20. The launch clutch 17 is then engaged to transfer drive torque from the input shaft 14, through the gears 16 and 32 to the first countershaft 20, and from the first countershaft 20 through gear 46 to the output gear 98, the differential assembly 100 and the axles or output shafts 104 and 106.

To engage second gear, the first double synchronizer clutch assembly 52 is translated to the left to synchronize and connect the gear 46 to the first countershaft 20. The first input clutch assembly 22 is then engaged to transfer drive torque from the input shaft 14, through the gears 18 and 34 to the first countershaft 20, and from the first countershaft 20 through gear 46 to the output gear 102, the differential assembly 100 and the axles or output shafts 104 and 106.

To engage third gear, the second double synchronizer clutch assembly 88 is translated to the left to connect the gear 84 to the second countershaft 60. The second input clutch assembly 62 is then engaged to transfer drive torque from the input shaft 14, through the gears 18 and 72 to the second countershaft 60, and from the second countershaft 60 through gear 84 to the output gear 98, the differential assembly 100 and the axles or output shafts 104 and 106.

To engage fourth gear, the first double synchronizer clutch assembly 52 is translated to the right to connect the gear 48 to the first countershaft 20. The launch clutch assembly 17 is then engaged to transfer drive torque from the input shaft 14, through the gears 16 and 32 to the first countershaft 20, and from the first countershaft 20 through gear 48 to the output gear 102, the differential assembly 100 and the axles or output shafts 104 and 106.

To engage fifth gear, the second synchronizer clutch assembly 88 is translated to the right to engage the gear 86 and connect it to the second countershaft 60. The second input clutch assembly 62 is then engaged to transfer drive torque from the input shaft 14, through the gears 18 and 72 to the second countershaft 60, and from the second countershaft 60 through gear 86 to the output gear 102, the differential assembly 100 and the axles or output shafts 104 and 106.

To engage sixth gear, the first double synchronizer clutch assembly 52 is translated to the right to connect the gear 48 to the first countershaft 20. The first input clutch assembly 22 is then engaged to transfer drive torque from the input shaft 14, through the gears 18 and 34 to the first countershaft 20, and from the first countershaft 20 through gear 48 to the output gear 102, the differential assembly 100 and the axles or output shafts 104 and 106.

Reverse is achieved by translating the synchronizer clutch assembly 77 to the right to engage the gear 74 and connect it to the second countershaft 60 and translating the second synchronizer clutch assembly 88 to the left to engage the gear 84 and connect it to the second countershaft 60. It is also possible to use a dog clutch or a sliding reverse configuration in place of the synchronized reverse. The launch clutch 17 is then engaged to transfer drive torque from the input shaft 14, through the gears 16 and 32 to the first countershaft 20, and from the first countershaft 20 through gear 31 to gear 74, and from gear 74 to the second countershaft 60, and through gear 84 to the output gear 98, the differential assembly 100 and the axles or output shafts 104 and 106.

It should be clear that there are instances where a stepped gear configuration can be used, for example to achieve a proper reverse gear while maintaining an optimum package. The direction reversal necessary for reverse is achieved by engagement of the first, driven gear 32 and the sixth, driven gear 74, as noted above.

Turning to FIG. 2, an embodiment of a seven speed transmission is illustrated and generally indicated by reference number 200. The transmission 200 is similar to the transmission 10 shown in FIG. 1 and like components are indicated by like reference numbers. However, the transmission 200 further includes a driven gear 202 freely rotatably disposed on the second countershaft 60. The driven gear 202 is in constant mesh with the gear 16. The driven gear 202 is rotationally coupled to the second countershaft 60 by a double sided synchronizer 75' which replaces the single sided synchronizer 75. Finally, disposed adjacent the driven gear 32 is a reverse dog clutch or single sided synchronizer clutch assembly 204. The synchronizer clutch assembly 204 is rotationally coupled to the first countershaft 20 by a synchronizer 206 and is free to translate axially along the first countershaft 20. A shift actuator assembly (not shown) which may be hydraulic, electric or pneumatic, engages and bi-directionally translates the synchronizer clutch assembly 204. When translated to the right from a neutral center position, the synchronizer clutch assembly 204 first synchronizes the speed of the adjacent gear 32 and then positively couples the synchronized gear 32 to the first countershaft 20.

In the embodiment illustrated in FIG. 2, the first driven gear 32 is associated and active with first gear, the second driven gear 34 is associated and active with second and fifth gears, the third drive gear 46 is associated and active with fifth gear, and the drive gear 48 is associated and active with first and second gears. The fifth driven gear 72 is associated and active with fourth and seventh gears, the sixth driven gear 74 and the drive gear 31 are associated and active with reverse, the driven gear 202 is associated and active with third and sixth gears, the seventh drive gear 84 is associated and active with sixth and seventh gears, and the drive gear 86 is associated and active with third and fourth gears and reverse.

For example, to engage first gear, the single sided synchronizer clutch assembly 204 is translated to the right to synchronize and connect the gear 32 to the first countershaft 20 and the first double synchronizer clutch assembly 52 is translated to the right to synchronize and connect the gear 48 to the first countershaft 20. The launch clutch 17 is then engaged to transfer drive torque from the input shaft 14, through the gears 16 and 32 to the first countershaft 20, and from the first countershaft 20 through gear 48 to the output gear 102, the differential assembly 100 and the axles or output shafts 104 and 106.

To engage second gear, the first double synchronizer clutch assembly 52 is translated to the right to synchronize and connect the gear 48 to the first countershaft 20. The first input clutch assembly 22 is then engaged to transfer drive torque from the input shaft 14, through the gears 18 and 34 to the first countershaft 20, and from the first countershaft 20 through gear 48 to the output gear 102, the differential assembly 100 and the axles or output shafts 104 and 106.

To engage third gear, the second double synchronizer clutch assembly 88 is translated to the right to connect the gear 86 to the second countershaft 60 and the third double synchronizer clutch assembly 75' is translated to the left to connect the gear 202 to the second countershaft 60. The launch clutch assembly 17 is then engaged to transfer drive torque from the input shaft 14, through the gears 16 and 202 to the second countershaft 60, and from the second countershaft 60 through gear 86 to the output gear 102, the differential assembly 100 and the axles or output shafts 104 and 106.

To engage fourth gear, the second double synchronizer clutch assembly 88 is translated to the right to connect the gear 86 to the first countershaft 20. The second input clutch assembly 62 is then engaged to transfer drive torque from the input shaft 14, through the gears 18 and 72 to the second countershaft 60, and from the second countershaft 60 through gear 86 to the output gear 102, the differential assembly 100 and the axles or output shafts 104 and 106.

To engage fifth gear, the first synchronizer clutch assembly 52 is translated to the left to engage the gear 46 and connect it to the first countershaft 20. The first input clutch assembly 22 is then engaged to transfer drive torque from the input shaft 14, through the gears 18 and 34 to the first countershaft 20, and from the first countershaft 20 through gear 46 to the output gear 98, the differential assembly 100 and the axles or output shafts 104 and 106.

To engage sixth gear, the second double synchronizer clutch assembly 88 is translated to the left to connect the gear 84 to the second countershaft 60 and the third double synchronizer clutch assembly 75' is translated to the left to connect the gear 202 to the second countershaft 60. The launch clutch assembly 17 is then engaged to transfer drive torque from the input shaft 14, through the gears 16 and 202 to the second countershaft 60, and from the second countershaft 60 through gear 84 to the output gear 98, the differential assembly 100 and the axles or output shafts 104 and 106.

To engage seventh gear, the second double synchronizer clutch assembly 88 is translated to the left to connect the gear 84 to the second countershaft 60. The second input clutch assembly 62 is then engaged to transfer drive torque from the input shaft 14, through the gears 18 and 72 to the second countershaft 60, and from the second countershaft 60 through gear 84 to the output gear 98, the differential assembly 100 and the axles or output shafts 104 and 106.

Reverse is achieved by translating the third synchronizer clutch assembly 75' to the right to engage the gear 74 and connect it to the second countershaft 60 and translating the single sided synchronizer clutch assembly 204 to the right to engage the gear 32 and connect it to the first countershaft 20, and translating the second synchronizer clutch assembly 88 to the right to engage the gear 86 and connect it to the second countershaft 60. The launch clutch 17 is then engaged to transfer drive torque from the input shaft 14, through the gears 16 and 32 to the first countershaft 20, and from the first countershaft 20 through gear 31 to gear 74, and from gear 74 to the second countershaft 60, and through gear 86 to the output gear 102, the differential assembly 100 and the axles or output shafts 104 and 106.

It should be appreciated that the transmission 200 may also be configured as an eight speed transmission without departing from the scope of the present invention. For example, engagement of the single sided clutch 204, the first synchronizer clutch assembly 52, and the launch clutch 17 may be associated with an additional forward gear. In this embodiment, the first driven gear 32 is associated and active with first and fifth gears, the second driven gear 34 is associated and active with second and sixth gears, the third drive gear 46 is associated and active with fifth and sixth gears, and the drive gear 48 is associated and active with first and second gears. The fifth driven gear 72 is associated and active with fourth and eighth gears, the sixth driven gear 74 and the drive gear 31 are associated and active with reverse, the driven gear 202 is associated and active with third and seventh gears, the seventh drive gear 84 is associated and active with seventh and eighth gears, and the drive gear 86 is associated and active with third and fourth gears and reverse.

The layshaft transmissions 10 and 200 according to the present invention provide many features and benefits. For example, there are fewer planes of gears compared to an equivalent dual clutch transmission. Additionally, the input clutches are disposed on the axes of the quills and countershafts. All of these features permit a more axially compact transmission. In fact, the nominal axial distance between the input shaft and the center of the differential is smaller than in most dual clutch transmission configurations.

The solid input shaft improves hydraulic pump packaging and provides the potential for improved hybridization. The gear sets between the input shaft and the gears on the quills reduce quill, clutch and countershaft speeds and thus reduce spin losses in both the gears and the input clutches relative to conventional dual clutch transmission configurations.

The description of the invention is merely exemplary in nature and variations that do not depart from the gist of the invention are intended to be within the scope of the invention. Such variations are not to be regarded as a departure from the spirit and scope of the invention.

What is claimed is:
1. A transmission comprising:
a transmission housing;
an input member connectable to a prime mover output member;
a first drive gear selectively connectable for common rotation with the input member;
a second drive gear rotatably fixed for common rotation with the input member;
a launch device connected to the input member and to the first drive gear, wherein the launch device is selectively engageable to transmit torque from the input member to the first drive gear;
a first countershaft rotatably supported within the transmission housing and spaced apart from and parallel with the input member;
a second countershaft rotatably supported within the transmission housing and spaced apart from and parallel with the input member;
a first driven gear in mesh with the first drive gear;
a second driven gear selectively connectable for common rotation with the first countershaft and in mesh with the second drive gear;
a transfer gear rotatably fixed for common rotation with the first countershaft;
a third driven gear selectively connectable for common rotation with the second countershaft and in mesh with the second drive gear;
a fourth driven gear selectively connectable for common rotation with the second countershaft and in mesh with the transfer gear;
a first output gear selectively connectable for common rotation with the first countershaft;
a second output gear selectively connectable for common rotation with the first countershaft;
a third output gear selectively connectable for common rotation with the second countershaft;
a fourth output gear selectively connectable for common rotation with the second countershaft;

two torque transmitting assemblies each for selectively coupling one of the second and third driven gears with one of the first countershaft and the second countershaft; and three synchronizer assemblies each for selectively coupling one of the fourth driven gear, the first output gear, the second output gear, the third output gear, and the fourth output gear with at least one of the first countershaft and the second countershaft, and wherein the selective engagement of the launch device, the two torque transmitting assemblies, and the three synchronizer assemblies establishes at least one of six forward speed ratios and a reverse speed ratio.

2. The transmission of claim 1 wherein the first driven gear is selectively connectable for common rotation with the first countershaft.

3. The transmission of claim 2 wherein a first of the two torque transmitting assemblies selectively connects the second driven gear to the first countershaft.

4. The transmission of claim 3 wherein a second of the two torque transmitting assemblies selectively connects the third driven gear to the second countershaft.

5. The transmission of claim 4 wherein a first of the three synchronizer assemblies selectively connects or disconnects at least one of the first output gear and the second output gear to the first countershaft.

6. The transmission of claim 5 wherein a second of the three synchronizer assemblies selectively connects or disconnects at least one of the third output gear and the fourth output gear to the second countershaft.

7. The transmission of claim 6 wherein a third of the three synchronizer assemblies selectively connects the fourth driven gear to the second countershaft.

8. The transmission of claim 2 wherein the launch device is a wet friction clutch.

9. The transmission of claim 2 wherein the first drive gear and the first driven gear form a first co-planar gear set, the second drive gear, the second driven gear, and the third driven gear form a second co-planar gear set, the fourth driven gear and the transfer gear form a third co-planar gear set, the first output gear and the third output gear form a fourth co-planar gear set, and the second output gear and the fourth output gear form a fifth co-planar gear set.

10. The transmission of claim 9 wherein at least one of the co-planar gear sets is a stepped co-planar gear set.

11. The transmission of claim 10 wherein the first driven gear and the transfer gear form a stepped gear.

12. The transmission of claim 11 wherein the first co-planar gear set is proximate a rear wall of the housing, the fifth co-planar gear set is proximate a front wall of the housing, the second co-planar gear set is disposed between the first co-planar gear set and the fifth co-planar gear set, and the third co-planar gear set is disposed between the first co-planar gear set and the second co-planar gear set, and the fourth co-planar gear set is disposed between the second co-planar gear set and the fifth co-planar gear set.

13. The transmission of claim 2 wherein two of the three synchronizer assemblies are doubled-sided synchronizer assemblies and one of the three synchronizer assemblies is a single-sided synchronizer assembly.

14. The transmission of claim 2 wherein the first driven gear is associated and active with first gear and fourth gear, the second driven gear is associated and active with second and sixth gears, the first output gear is associated and active with first and second gears, the second output gear is associated and active with fourth and sixth gears, the third driven gear is associated and active with third and fifth gears, the fourth driven gear and the transfer gear are associated and active with reverse, the third output gear is associated and active with third gear and reverse, and the fourth output gear is associated and active with fifth gear.

15. The transmission of claim 2 further comprising a fourth synchronizer assembly for selectively connecting the first driven gear to the first countershaft.

16. The transmission of claim 15 further comprising a fifth driven gear selectively connectable to the second countershaft and in mesh with the first drive gear.

17. The transmission of claim 16 wherein three of the four Synchronizer assemblies are double-sided synchronizer assemblies and one of the four synchronizer assemblies is a single-sided synchronizer assembly.

18. A transmission comprising:
a transmission housing;
an input member connectable to a prime mover output member;
a first drive gear selectively connectable for common rotation with the input member;
a second drive gear rotatably fixed for common rotation with the input member;
a launch device connected to the input member and to the first drive gear, wherein the launch device is selectively engageable to transmit torque from the input member to the first drive gear;
a first countershaft rotatably supported within the transmission housing and spaced apart from and parallel with the input member;
a second countershaft rotatably supported within the transmission housing and spaced apart from and parallel with the input member;
a first driven gear selectively connectable for common rotation with the first countershaft and in mesh with the first drive gear;
a second driven gear selectively connectable for common rotation with the first countershaft and in mesh with the second drive gear;
a transfer gear rotatably fixed for common rotation with the first countershaft;
a third driven gear selectively connectable for common rotation with the second countershaft and in mesh with the second drive gear;
a fourth driven gear selectively connectable for common rotation with the second countershaft and in mesh with the transfer gear;
a fifth driven gear selectively connectable for common rotation with the second countershaft and in mesh with the first drive gear;
a first output gear selectively connectable for common rotation with the first countershaft;
a second output gear selectively connectable for common rotation with the first countershaft;
a third output gear selectively connectable for common rotation with the second countershaft;
a fourth output gear selectively connectable for common rotation with the second countershaft;
two torque transmitting assemblies each for selectively coupling one of the second and third driven gears with one of the first countershaft and the second countershaft; and
four synchronizer assemblies each for selectively coupling one of the fourth driven gear, the first output gear, the second output gear, the third output gear, and the fourth output gear with at least one of the first countershaft and the second countershaft, and wherein the selective engagement of the launch device, the two torque transmitting assemblies, and the three synchronizer assemblies establishes at least one of seven forward speed ratios and a reverse speed ratio.

19. The transmission of claim 18 wherein the first driven gear is associated and active with first gear, the second driven gear is associated and active with second and fifth gears, the first output gear is associated and active with fifth gear, the second output gear is associated and active with first and second gears, third driven gear is associated and active with fourth and seventh gears, the fourth driven gear and the transfer gear are associated and active with reverse, the fifth driven gear is associated and active with third and sixth gears, the third output gear is associated and active with sixth and seventh gears, and the fourth output gear is associated and active with third and fourth gears and reverse.

* * * * *